United States Patent [19]

Makabe et al.

[11] Patent Number: 4,643,587

[45] Date of Patent: Feb. 17, 1987

[54] TEMPERATURE DATA PRODUCING APPARATUS FOR HIGH TEMPERATURE MOVING OBJECTS

[75] Inventors: Eiichi Makabe, Yokohama; Naoki Harada, Tokyo; Kiyotaka Imai, Yokohama; Yoshiro Hosoda, Ebina; Akira Kato, Yokohama, all of Japan

[73] Assignee: Nippon Kokan Kabushiki Kaisha, Tokyo, Japan

[21] Appl. No.: 774,820

[22] Filed: Sep. 11, 1985

[30] Foreign Application Priority Data

Sep. 20, 1984 [JP] Japan .................... 59-197062

[51] Int. Cl.⁴ ..................... G01J 5/02; G01K 3/00
[52] U.S. Cl. ..................... 374/104; 250/443.1; 374/124
[58] Field of Search ............... 374/163, 104; 250/443.1; 324/71.3; 219/121 EM, 121 EP, 121 EY

[56] References Cited

U.S. PATENT DOCUMENTS

| | | |
|---|---|---|
| 2,417,213 | 3/1947 | Picard ..................... 250/443.1 |
| 2,728,840 | 12/1955 | Columbe ..................... 250/443.1 X |
| 3,919,558 | 11/1975 | Brouilette et al. ............... 250/443.1 |
| 4,040,563 | 8/1977 | Schairer ..................... 374/104 X |
| 4,221,125 | 9/1980 | Oliver et al. ............... 73/61.1 R X |
| 4,312,009 | 1/1982 | Lange ..................... 250/316.1 X |
| 4,317,983 | 3/1982 | Scheffels et al. ........ 219/121 EM X |
| 4,420,720 | 12/1983 | Newton et al. ............... 324/71.3 X |
| 4,455,532 | 6/1984 | Gregory et al. ............... 324/71.3 X |
| 4,468,136 | 8/1984 | Murphy et al. ............... 374/124 X |
| 4,471,378 | 9/1984 | Ng ..................... 358/113 X |

Primary Examiner—Daniel M. Yasich
Attorney, Agent, or Firm—Frishauf, Holtz, Goodman & Woodward

[57] ABSTRACT

The tip of an alloy rod in a vacuum chamber is remelted by radiation with an electron beam from an electron gun and the remelted droplets fall into a mold where they solidify. The droplets are scanned a plurality of times through a window provided on the vacuum chamber by an image pickup device as they pass its field of view. From the signal of the maximum level obtained during these scans, temperature data of the droplet is obtained by a temperature measurement control device.

7 Claims, 5 Drawing Figures

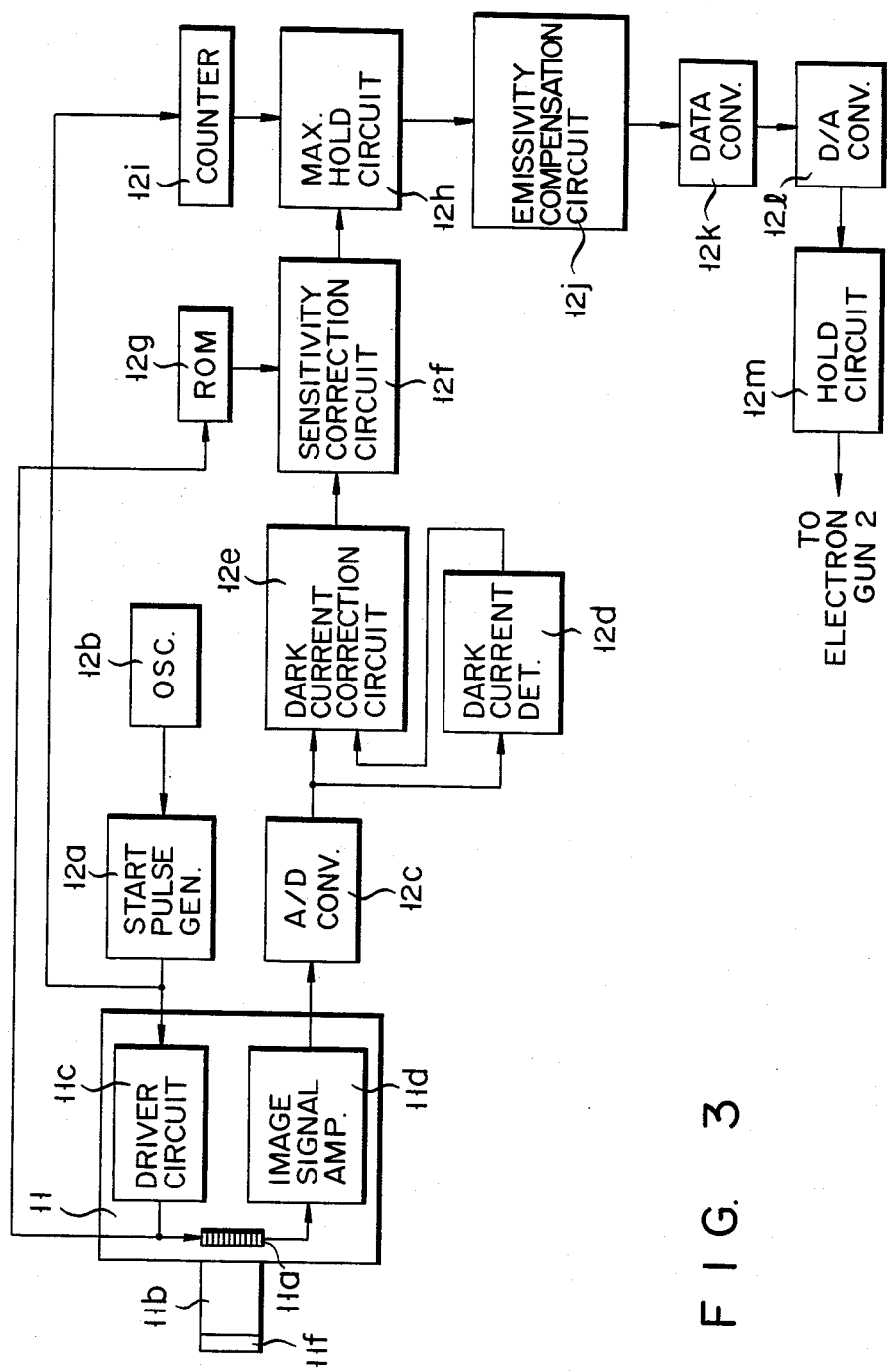
F I G. 3

TEMPERATURE DATA PRODUCING APPARATUS FOR HIGH TEMPERATURE MOVING OBJECTS

BACKGROUND OF THE INVENTION

This invention relates to a temperature data producing apparatus for noncontact measuring of the temperature of a high temperature moving object such as a naturally falling melted metal droplet.

When metal material, particularly, metals having a high melting point such as niobium, molybdenum and tungsten or active metals such as titanium and zircon are melted in the air, impurities such as oxides and nitrides are formed inside the metals, thus greatly degrading the various characteristics of each metal. This same phenomenon occurs in super alloys such as corrosion and heat resistant alloys. In order to produce high quality ingots, it is necessary to remelt these metals in a vacuum chamber, to eliminate the impurities such as hydrogen, oxygen, nitrogen, tin and lead by exposure to the vacuum. This remelted metal is dropped into a mold that does not react chemically with the remelted metal where it solidifies into an ingot. To make the metal drop into the mold, it is heated with an electric arc, plasma or electron beam to melt it. Copper molds with water cooled surfaces are often used.

It is known that the temperature of the remelted alloy droplets is an important factor in determining the surface quality such as the ingot surface smoothness and the internal quality, which represents the macro structure and the compositional segregation of the solidified alloy in the mold.

However, the naturally falling melted metal droplets are very small having a diameter of 5-15 mm, fall with the acceleration of gravity, and are in a vacuum chamber, making accurate measurement of the temperature an impossibility. It is consequently impossible to control the temperature of the droplets and very difficult to obtain ingots of high quality. This is the same for pure metals such as niobium, molybdenum and tungsten.

SUMMARY OF THE INVENTION

The object of this invention is to provide a temperature data producing apparatus for continuously, accurately and without contact-measuring the temperature of a high temperature object moving in a vacuum chamber.

In this invention a temperature data producing apparatus comprises means for line scanning a moving high temperature object, which is in a droplet state, in a direction intersecting the direction of droplet movement, and generating an image signal; means for detecting the maximum level of the image signal obtained within a prescribed period of time, and means for obtaining a temperature signal showing the temperature corresponding to this maximum level.

BRIEF DESCRIPTION OF THE DRAWINGS

This invention may be better understood by reference to the drawings in which:

FIG. 3 is a schematic circuit diagram of the first embodiment;

DETAILED DESCRIPTION OF THE PREFERRED EMBODIMENT

The following is a detailed description taken in conjunction with the drawings of the preferred embodiment of the invention.

Figure 1:
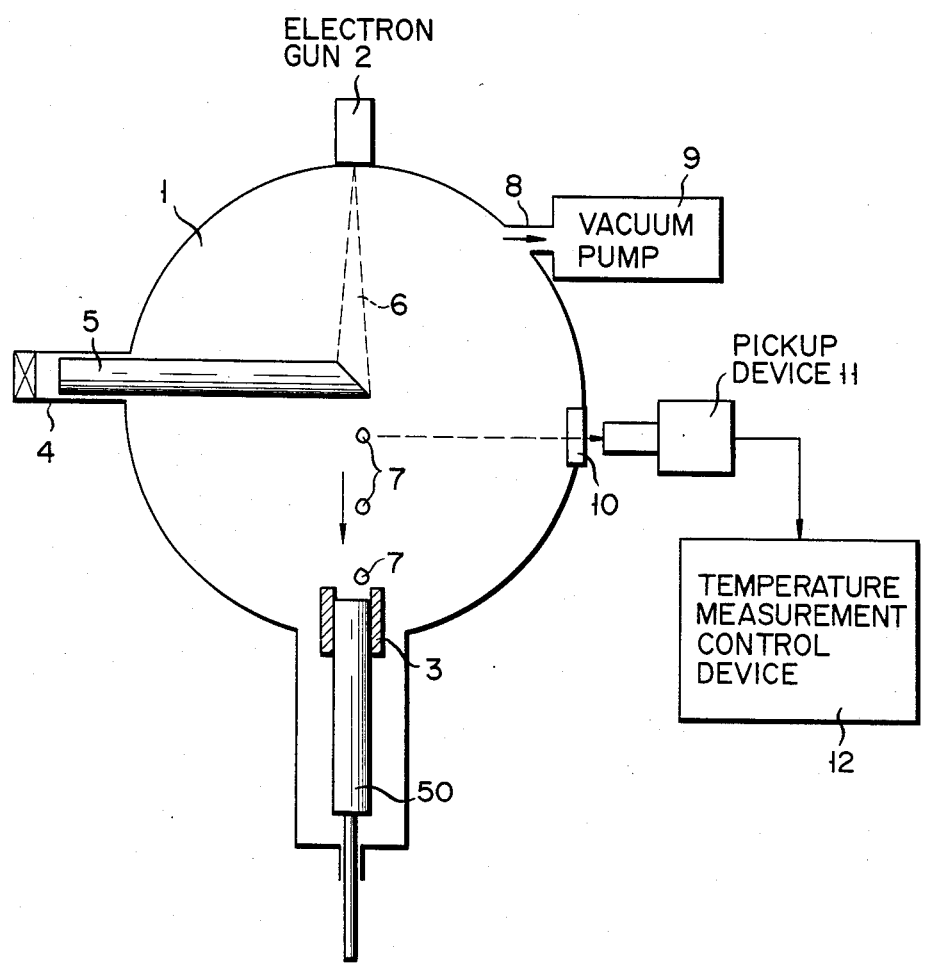
FIG. 1 is simplified example of the structure of the first embodiment of this invention.

In FIG. 1 at the top of a spherical metal vacuum chamber 1 an electron gun 2 is attached, and at the bottom a water-cooled copper mold 3 is provided. A rod 5 of a high melting point metal such as niobium, molybdenum, or tungsten, etc. is inserted into a hollow holding section 4 formed protruding to the outside on the side of vacuum chamber 1. The tip of metal rod 5 is heated by radiating it with an electron beam 6 from electron gun 2. The tip consequently melts and droplets 7 fall to the bottom where they solidify into ingot 50 inside mold 3. The oxygen and nitrogen gases, etc. formed during the process of melting rod 5 and solidifying into ingot are sucked out by a vacuum pump 9 connected to an opening 8 of vacuum chamber 1.

An airtight window 10 is formed in the side wall of vacuum chamber 1. An image pickup device 11 including a line sensor is provided with the receiving end facing the outside of window 10. This pickup device 11 comprises a photodiode array, linear array or CCDs, etc., containing 2048 photoelectric cells arranged in a row. The direction of this line of photoelectric cells intersects the direction of fall of droplets 7 and should preferably intersect at right angles. The output signals of pickup device 11 are supplied to temperature measurement control device 12 to be described later. The photosensitive area of, for example, 47 elements from one end of the row of the 2048 elements are covered with an opaque seal so that only a dark current is obtained from these elements.

The following is a description taken in conjunction with FIG. 3 of the structure of temperature measurement control device 12. Line sensor 11a provided in image pickup device 11 comprises 2048 elements of CCD. Lens system 11b and filter 11f are provided at the front of the photosensitive area of line sensor 11a. Line sensor 11a is driven by driver circuit 11c which is driven by a start pulse from start pulse generator 12a which is provided inside temperature measurement control device 12. Accordingly, line sensor 11a performs one line scan each time a start pulse is generated. Start pulse generator 12a comprises a frequency divider, for example, which divides the output pulse from oscillator 12b at a prescribed dividing ratio to form a start pulse.

The image signal of droplet 7 obtained from line sensor 11a is converted to a digital signal by A/D converter 12c provided inside control device 12 after it has been amplified by amplifier 11d. Of the digital image signal obtained in this way, the dark current outputs of the 1st to 47th photoelectric cells are supplied to the dark current detector 12d where the average value of each dark current of the 47 photoelectric cells is determined. The detection signal showing the average value of the dark currents is supplied to dark current correction circuit 12e together with the output of A/D converter 12c. Dark current correction circuit 12e may be a subtractor circuit, for example, which by subtracting the output of detector 12d from the output of circuit 12c removes the dark current component from the digital image signal.

The digital image signal output from dark current correction circuit 12e is next supplied to sensitivity correction circuit 12f. The sensitivity of each of the photoelectric cells in line sensor 11a is not uniform and, accordingly, a prescribed reference level signal for each of the 48th to 2048th elements is determined, and the output difference (differential output) of this reference level signal and the photoelectric conversion output obtained from each element when a constant intensity light is applied is determined. This output difference shows the variation value of the sensitivity of each photoelectric cell. These variation values are prestored in ROM 12g. During operation addresses of ROM 12g are specified in synchronism with the operation of each element driven by the output of drive circuit 11c, and sensitivity correction data at those addresses is read out from ROM 12g and supplied to sensitivity correction circuit 12f.

The output of sensitivity correction circuit 12f is next supplied to maximum value hold circuit 12h, which is controlled by the output of counter 12i, which is a maximum value detection period setting circuit. Counter 12i counts the start pulses from start pulse generator 12a, for example, counts 500 start pulses, outputs a carry signal, and is reset. Accordingly, maximum value hold circuit 12h holds the maximum value of the image signal obtained during 500 scans of the line sensor 11a.

This maximum value data is supplied to emissivity compensation circuit 12j, which, because the emissivity is different for different metals even if the temperature is the same, compensates the emissivity of droplets 7 being detected by line sensor 11a. The relationship of the temperature and emissivity of each metal can be determined from various available publications. Circuit 12j may be comprised, for example, of a calculator having a coefficient corresponding to the predetermined emissivity of the metal.

The maximum value data for which the emissivity has been compensated is next sent to the data converter circuit 12k where the temperature data corresponding to the maximum value is determined. Data converter circuit 12k comprises a ROM table, for example, for use in outputting the droplet temperature corresponding to the applied maximum value data. Using the input maximum value data as an address signal to obtain the corresponding temperature data is obtained from data converter circuit 12k. This temperature data is a digital signal and is converted to an analog signal by D/A converter 12l, and is held at hold circuit 12m as needed. The output of hold circuit 12m may be used for controlling output beam of the electron gun 2 to control the temperature of droplet 7.

Figure 2:
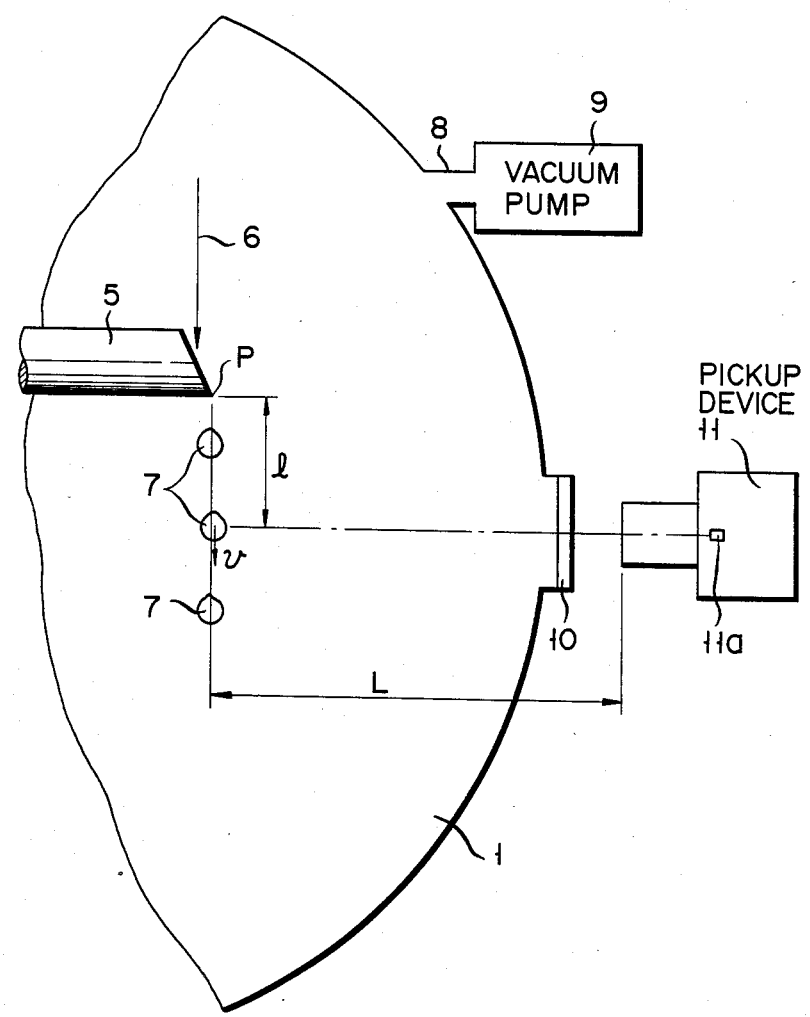
FIG. 2 is an enlarged view of part of FIG. 1.

The following is a description of the operation of the embodiment having the above structure. When electron gun 2 shown in FIG. 1 is driven, the tip of metal material 5 melts and drops into mold 3 in the form of droplets 7. As shown in FIG. 2, the falling speed v of droplet 7 at the time when droplet 7 is at an image pickup position which is the distance l from the tip P of rod 5, which is the starting point of fall is determined as follows:

$$v = \sqrt{2gl} \quad (1)$$

where g is the acceleration rate of gravity.

Figure 4:
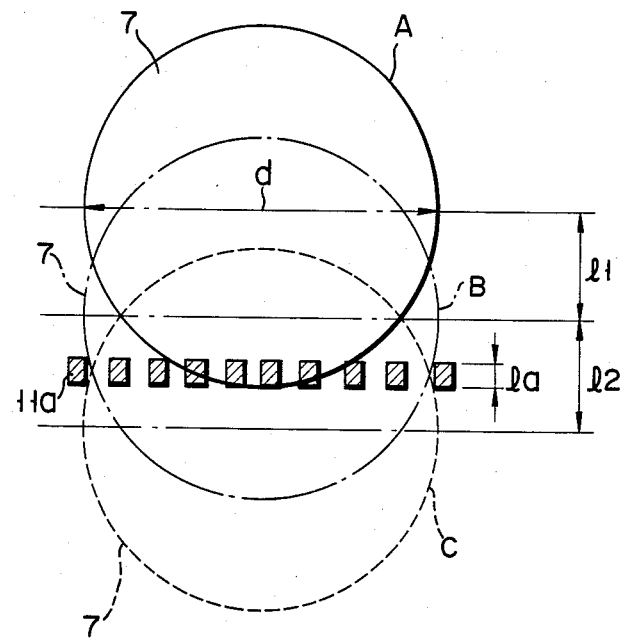
FIG. 4 shows the relationship of the object and the imaging field of the line sensor.

The following is an explanation of the relationship between the field of view of line sensor 11a, the relative position of falling droplet 7 and the output of line sensor 11a. It is assumed that droplet 7 in FIG. 4 is nearly a perfect sphere. At a certain point in time t the position of one droplet 7 at the time of sensor 11a's scan is shown by A, the next point in time (t+1) is the position B, and the point in time (t+2) of the next scan is the position C. At position A only a tiny part of the bottom of droplet 7 is inside the range of view of line sensor 11a and accurate measurement of the temperature is not possible, however, in the following positions B and C satisfactory temperature measurement is possible.

If the scanning frequency of line sensor 11a is taken to be f, then in order for droplet 7 to be within the field of view of line sensor 11a in the period from the start of one scan to the finish the following equation must be satisfied:

$$d \geq l_1 + l_2 + l_a = 2X \frac{\sqrt{2gl}}{f} + l_a \quad (2)$$

where
  d: diameter of droplet 7
  l1, l2: falling distance of droplet 7 in period 1/f of one scan by line sensor 11a
  $l_1 \approx l_2$ and
  la: spatial resolution of line sensor 11a along the falling direction of droplet 7.

In this embodiment line sensor 11a is set at l = 150 mm and L = 1000 mm, as is shown in FIG. 2. The photosensitive area of each of the photoelectric cells which comprise line sensor 11a is 14 μm×9 μm, the scan frequency of line sensor 11a is 1000 Hz and the focal distance F of lens system 11b is 100 mm. It is confirmed that the diameter of droplets 7 is in the range of 5 mm to 15 mm so during the time when one droplet 7 drops from tip P of rod 5 to mold 3, it is possible for line sensor 11a to perform 2 to 6 scans. In general, if the size of droplet 7 decreases, the necessary number of scans can be obtained by increasing the scanning frequency.

The timing at which droplets 7 fall from metal material 5 and the size of the droplets varies randomly. Accordingly, in this embodiment one measurement period is set at a plurality of line scans and the maximum level of the image signals obtained within this set time period is detected. This detected value is output as representative data showing the temperature of a group of droplets falling within this set time period.

Figure 5:
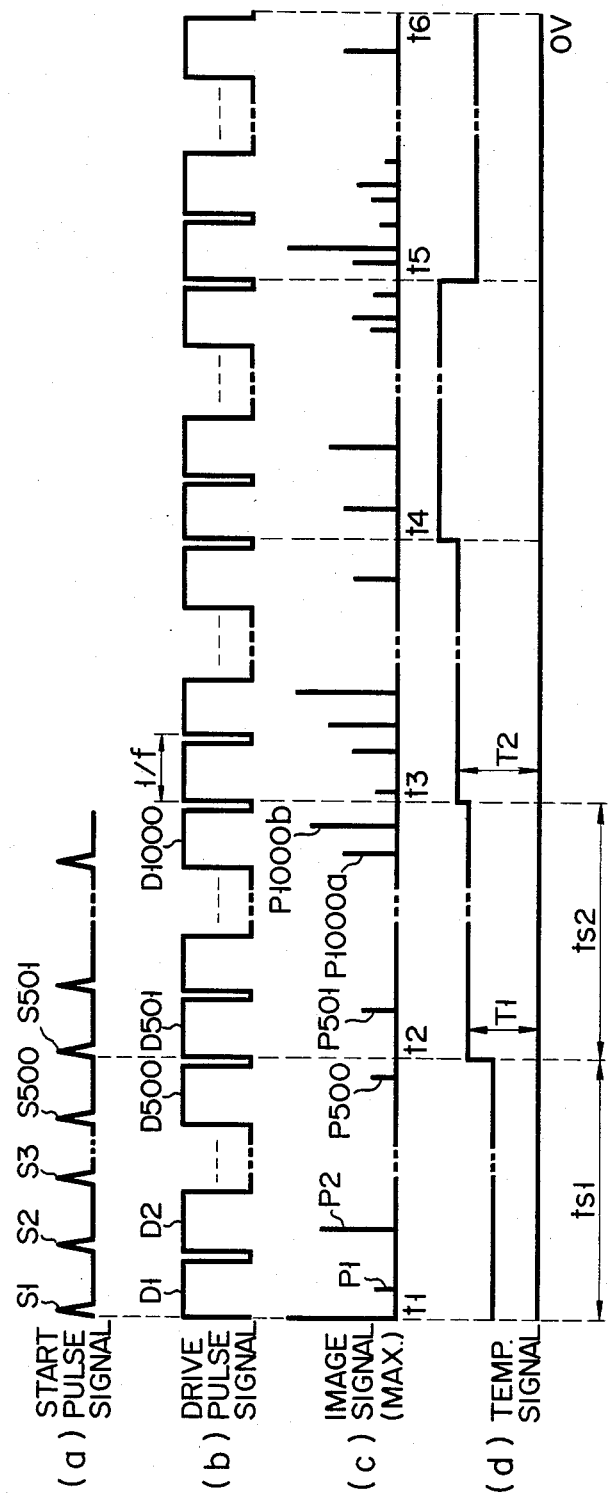
FIG. 5 is a time chart of the operation of the circuit shown in FIG. 3.

When the first start pulse S1 from start pulse generator 12a shown in FIG. 3 and having a scanning frequency f as shown in FIG. 5(a) is supplied to drive circuit 11c at time t1, a drive signal D1 having a period of 1/f, as shown in FIG. 5(b), is output from drive circuit 11c to drive line sensor 11a. Consequently, in the scan period for drive signal D1 one maximum image value P1, as shown in FIG. 5(c), is obtained and held in maximum value hold circuit 12h.

When the second start pulse S2 is supplied, the second drive signal D2 is output to obtain the maximum value P2. Maximum value P2 is larger than maximum value P1 of the previous scan so P2 is held in circuit 12h in place of P1. This process is repeated for five hundreds of times. When the 500th start pulse S500 is supplied, the 500th drive signal D500 is generated to perform the 500th scan. The maximum value P500 obtained in the 500th scan is smaller than the maximum value P2 that is being held so the maximum value obtained in the five hundreds of scans in the time period ts1 is P2.

This maximum value P2 held in hold circuit 12h is supplied to temperature data converter circuit 12k by way of emissivity compensation circuit 12j by the carry signal of counter 12i generated by the 501th start pulse, and a temperature signal of level T1, as shown in FIG. 5(d), is obtained. Maximum value hold circuit 12h is cleared simultaneously with the output of maximum value P2.

Drive pulse signal D501 is generated by the 501th start pulse S501, which is generated at time t2, and the maximum value P501 is obtained in the 501th scan period. Similarly, in the second prescribed period ts2 when the maximum value is sequentially determined, it is found that the maximum value P1000b obtained in the period of the 1000th drive signal D1000, as shown in FIG. 5(c), is the largest value. Maximum value P1000b is supplied to temperature data converter 12k by way of emissivity compensation circuit 12j by the carry signal of counter 12i, and a level T2 temperature signal is obtained.

The temperature signals T1, T2 obtained in this way are converted to analog signals by D/A converter 12, and, if necessary, can be used for output control of electron gun 2, for example, after being held in hold circuit 12m. In this way, it is possible to accurately set the temperature of the metal droplets 7 in vacuum chamber 1, making possible stable and continuous manufacture of uniform high quality ingots. In an experiment conducted by the inventors, it is possible to manufacture high quality ingots with a uniform hardened structure by controlling the output of electron gun 2 to suitably control the temperature of the falling droplets from rod 5 in response to the structure of the rod.

This invention is not limited to use of an electron beam as the remelting device. For example, it is possible to use an electric arc apparatus in the vacuum, and a vacuum plasma beam, etc, for remelting. It is also possible to use an inert gas atmosphere for remelting instead of a vacuum.

What is claimed is:

1. A temperature data producing apparatus, comprising:

means for melting a metal material to provide a plurality of high temperature objects in droplet form naturally falling in the vertical direction in a vacuum chamber;

means for generating an image signal by line scanning a plurality of said falling high temperature objects in droplet form in a direction intersecting the direction of movement of the object;

means for detecting a maximum level of said image signals obtained within a prescribed time period; and means for obtaining a temperature signal showing the temperature of the objects corresponding to the maximum level.

2. A temperature data producing apparatus according to claim 1, wherein said image signal generating means includes a plurality of photoelectric converting elements arranged in a single row in a direction intersecting the direction of movement of said high temperature moving objects.

3. A temperature data producing apparatus, comprising:

means for generating an image signal by line scanning a plurality of moving high temperature objects in droplet form in a direction intersecting the direction of movement of the objects, said high temperature objects being naturally falling metal droplets melted by an electron beam in a vacuum chamber;

means for detecting a maximum level of said image signals obtained within a prescribed time period; and means for obtaining a temperature signal showing the temperature of the objects corresponding to the maximum level.

4. A temperature data producing apparatus according to claim 3, wherein said image signal generating means includes a line sensor provided in an image pickup device, and said image pickup device includes means for line-scanning a plurality of times in said prescribed time period the moving object which has entered within its field of view.

5. A temperature data producing apparatus according to claim 3, wherein said image signal generating means includes a plurality of photoelectric converting elements arranged in a single row in a direction intersecting the direction of movement of said high temperature moving object.

6. A temperature data producing apparatus, comprising:

means for generating an image signal by line scanning a plurality of naturally falling high temperature objects in a vacuum chamber in droplet form in a direction intersecting the direction of movement of the objects, said image signal generating means including a line sensor provided in an image pickup device which includes means for line-scanning a plurality of times in said prescribed time period the moving object which has entered its field of view;

means for detecting a maximum level of said image signals obtained within a prescribed time period; and means for obtaining a temperature signal showing the temperature of the objects corresponding to the maximum level.

7. A temperature data producing apparatus according to claim 6, wherein said line sensor includes a plurality of photoelectric converting elements arranged in a single row in a direction intersecting the direction of movement of said high temperature moving object.

* * * * *